(No Model.)  2 Sheets—Sheet 1.

T. K. CLARK.
MACHINE FOR CHANNELING HARNESS STRAPS.

No. 320,628.  Patented June 23, 1885.

Witnesses:
R. E. Grant
G. E. Tucker

Inventor:
Thomas K. Clark
by Johnson & Johnson
Att'ys.

(No Model.)  2 Sheets—Sheet 2.
T. K. CLARK.
MACHINE FOR CHANNELING HARNESS STRAPS.
No. 320,628. Patented June 23, 1885.
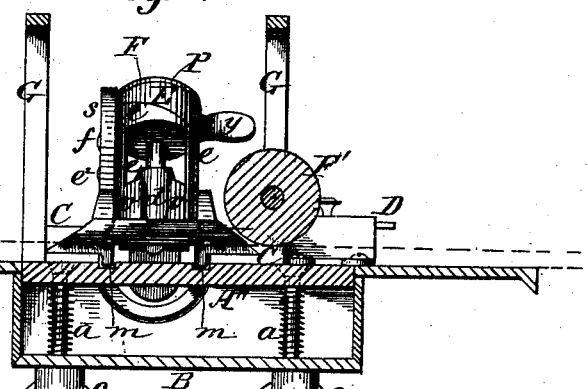
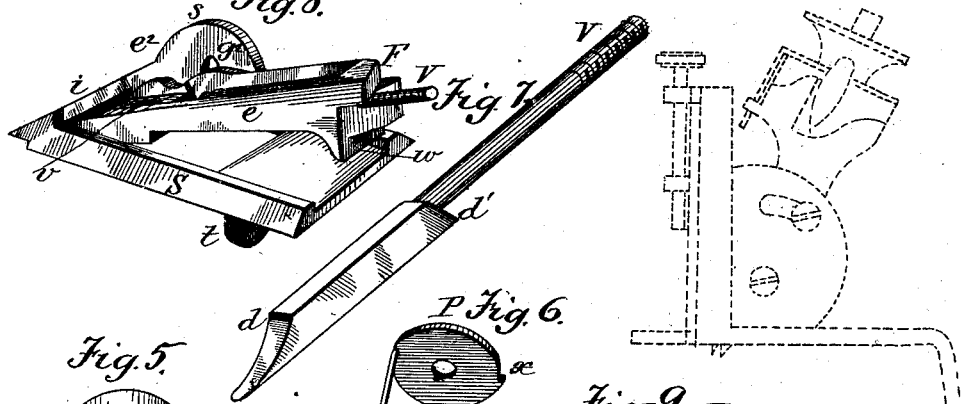
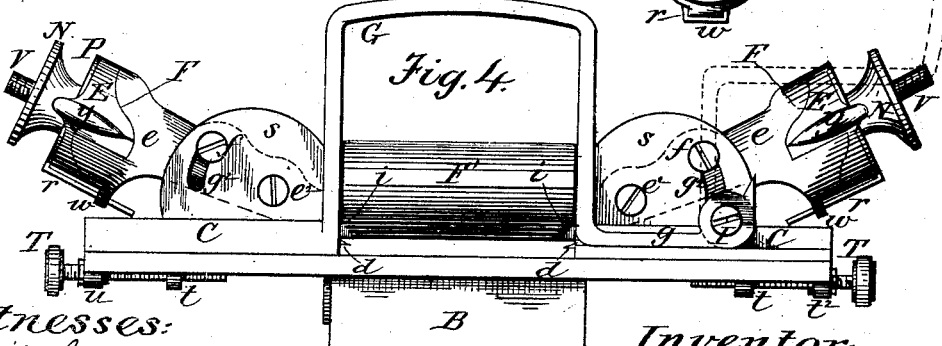
Witnesses:
R. E. Grant
G. E. Tucker
Inventor:
Thomas K. Clark,
by Johnson & Johnson
Attys.

UNITED STATES PATENT OFFICE.

THOMAS K. CLARK, OF GERMANIA, KANSAS.

MACHINE FOR CHANNELING HARNESS-STRAPS.

SPECIFICATION forming part of Letters Patent No. 320,628, dated June 23, 1885.

Application filed November 21, 1884. (No model.)

*To all whom it may concern:*

Be it known that I, THOMAS K. CLARK, a citizen of the United States, residing at Germania, in the county of Sedgwick and State of Kansas, have invented certain new and useful Improvements in Machines for Channeling Harness-Straps, of which the following is a specification.

My invention relates to improvements in the machine for channeling harness-straps for which Letters Patent of the United States were granted to me August 21, 1883, under No. 283,570.

My present improvement is directed to a more efficient working of the device for cutting the oblique channel in the edge of the strap for round work, the cutting-blades being carried and adjusted by an improved construction and better means of adjustment, as will be hereinafter described in connection with the accompanying drawings, in which—

Figure 1:
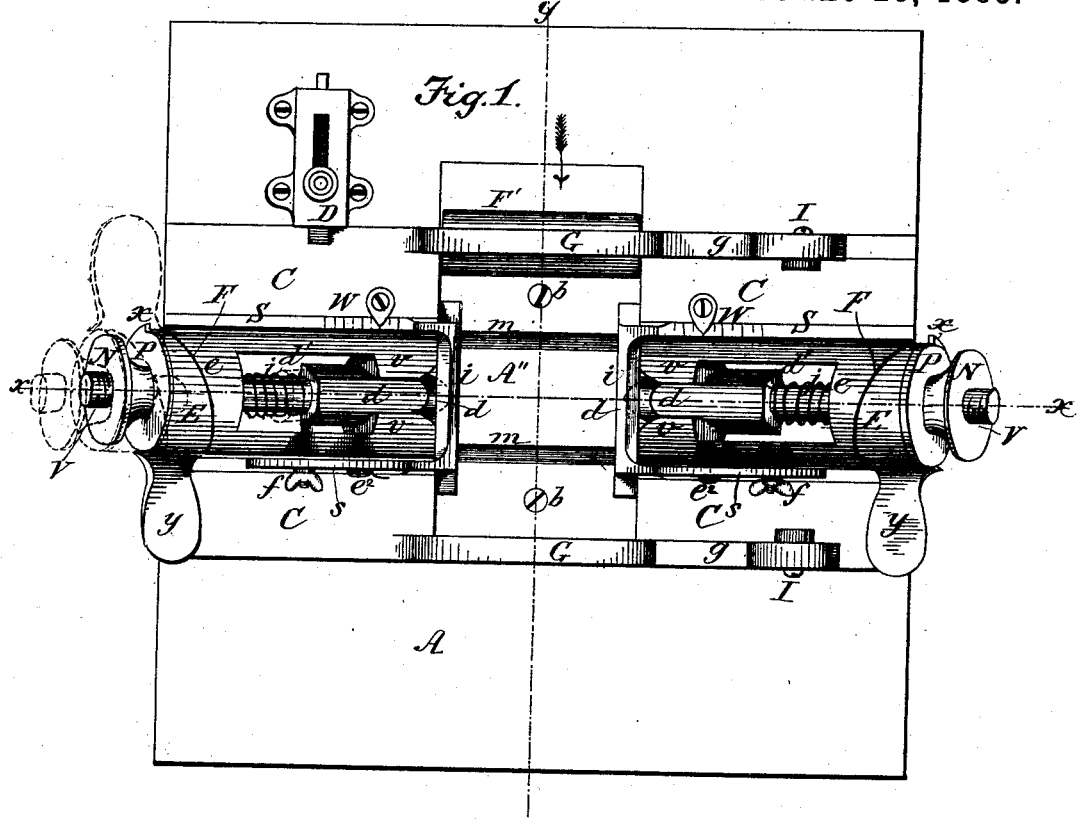
Figure 2:
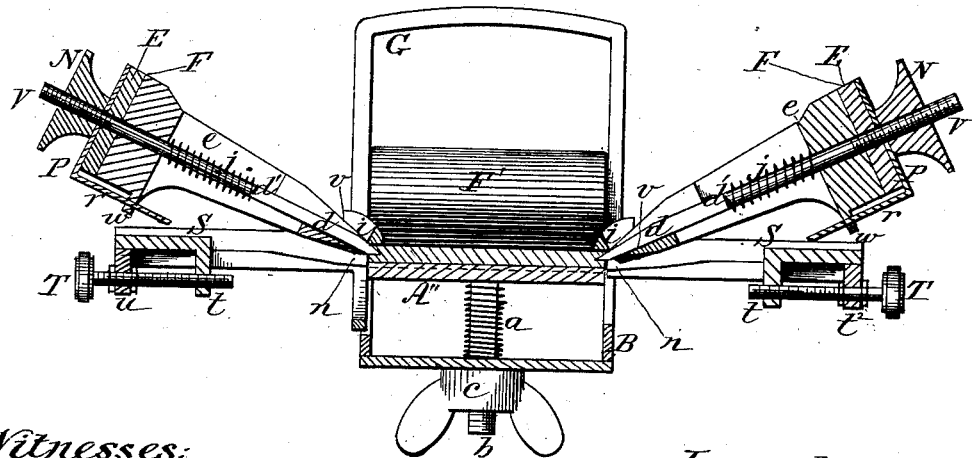

Figure 1 represents a top view of my improved machine for channeling harness-straps; Fig. 2, a vertical section, taken through the line $x\,x$ of Fig. 1; Fig. 3, a vertical section of the same, taken on the line $y\,y$ of Fig. 1; Fig. 4, a side elevation. Fig. 5 shows one of the cam-buttons. Fig. 6 shows one of the locking-washers of the cutter-stock separated; Fig. 7, one of the cutters; Fig. 8, the cutter-stock and the cutter-carriage; Fig. 9, an end view of the nut and locking-washer, and Fig. 10 an end view of the cutter-stock.

The channeling devices are mounted upon a table, A, provided with a bed, A″, supported upon springs $a$, which act to constantly press it upward. In the example shown the springs and the bed are arranged within a box, B, on the under side of the table, upon the bottom of which the springs are seated; and the adjustment of the bed is effected by screws $b$, having their heads countersunk in the upper surface of the bed, the height of which is controlled by thumb-nuts $c$, on the under side of the box, so as to maintain the bed on a level with the table. Over this yielding bed the leather strap is drawn beneath the cutter-blades $d$, arranged to channel the edges of the leather strap for what is known as "round work." These cutter-blades are carried in inclined positions by my improved construction, which I will now describe in connection with the means for their adjustment in the direction of their length and to vary the angle of their inclination.
A carriage, S, is fitted in guides C on each side of the yielding bed, and is made adjustable at right angles thereto by a screw, T, tapped in a projection, $t$, on the under side of the carriage. One of these carriage-guides is fixed upon the table, and the other is carried by a yoked frame, G, the arms $g$ of which are pivoted at I to the fixed guide C on each side of the carriage. (See Fig. 4.) One of the screws T is shouldered in a fixed part, $t^2$, of the table, and the other is shouldered in a a cross-bar, $u$, at the non-pivoted end of the yoked frame, as shown in Fig. 2. Each carriage S has a vertical projection, $s$, at one side, and to the inner wall of each projection the inclined cutter-stocks $e$ are pivoted at $e^2$, so that the lower end of each will project into an opening formed in the inner end of the carriage bed.

Each cutter-stock is open in the middle and is secured to the carriage projection $s$ by a clamp-screw, $f$, Fig. 4, which, passing through a slot, $g^2$, in said carriage projection $s$, serves to adjust the cutter-stock to the required angle to bring the cutting-blade in proper relation to the edge of the strap.

The cutter is fitted in guides $v$ in the stock $e$, and has its blade $d$ formed to cut the required channel in the edge of the strap, while its shank or stem has a screw, V, formed upon its outer end. That part upon which the cutting end is formed is beveled on its opposite sides, and is fitted within corresponding guides, $v$, formed in the pivoted end of the stock, as seen in Fig. 1, while the screw-shank is cylindrical and passes through a non-threaded opening in the outer end of the cutter-stock. A spiral spring, $j$, is placed upon the cutter-shank within the open stock, and bearing against the stock at the outer end of its opening and against a shoulder, $d'$, on the body of the cutter constantly tends to force the cutter-blade $d$ inward, while the latter is free to be drawn out against the tension of the spring. The inner end of each carriage has an overhanging cross-bar, $i$, arranged above the cutting-blade, so as to overlap the edges of the strap, as shown in Fig. 2, and hold it down upon the spring-bed.

From the bottom of each carriage, just back of the overhanging cross-bar $i$, is a rib, $n$, placed in line with the cross-grooves m in the top of the bed, as shown in Figs. 1, 2, and 3. and the ends of these ribs form the guides between which the strap is drawn in the direction of the arrow, Fig. 1. When the strap is in place, the carriages are adjusted by their thumb-screws T, so as to bring the ends of their ribs n against the edges of the strap, as shown in Fig. 2, and thus form a gage to limit the adjustment of the carriages to bring the cutter-blades in proper positions to cut the edge-channels.

The pivoting of the yoke-frame and the arrangement of one of the cutter-carriages in its free end, as described, is for the purpose of allowing one of the cutter-carriages to be turned up with the yoke-frame out of the way in placing the strap upon the bed for work.

One or more spring-catches, D, secured to the table, serve to hold the yoke-frame secure when the machine is adjusted for work.

Provision is made for drawing the cutting-blades back out of the way in placing the strap upon the bed, for properly setting the cutters to enter the strap at the required oblique or slanting direction, for locking the cutters when set, and also for gaging the depth of the channel.

The provision for drawing the cutter-blades back in their stock-guides consists of a cam-button, E, placed upon the screw end of the cutter-shank and seated or bearing upon a corresponding cam formation, F, on the outer end of the cutter-stock e, as shown in Figs. 1, 5, and 8. The cam-button turns freely upon the stem of the cutter-blade, but is held thereon by a thumb-nut, N, whereby to effect its cam action upon the end of the cutter-stock to draw out the cutter by turning said button.

The provision for setting the cutter-blade to gage the depth of the channel, consists of the screw V on the cutter-stem, the thumb-nut N, and the spiral spring j, and by unscrewing the nut the spring will force the cutter inward, and hold it with sufficient force at the same depth in the strap.

The provision for locking the thumb-nut N, when set, consists of a locking-washer, P, placed upon the cutter-stem outside of the cam-button, and held from turning by an arm, r, entering a hole in a projection, w, on the under side of the cutter-stock, so that the turning of the cam-buttons to draw out the cutter-blades, and to allow them to be retracted by the springs j, cannot affect the adjustment of the thumb-nuts. The washers serve also to prevent the cam-buttons from being turned too far by the provision of a stop, x, (see Fig. 9,) arranged to receive the handle y of the cam-button, as the latter is turned upon the cutter-stock cam formation, for the purpose stated.

The pivoting of the cutter-stock, as a provision for adjusting the angle of inclination of the cutter-blades, gives the advantage of quickly and easily adjusting and setting the cutter-blades for channeling not only at the proper angle, but for narrow and wide straps.

Scales W are provided upon the cutter-carriages, or upon the guides, whereby to determine the uniform adjustment of the cutter-carriages, as shown at Fig. 1.

The yoke-frame G carries a roller, F′, in position to bear upon and hold the strap down upon the yielding bed as it is drawn forward to the cutters.

The strap is drawn by hand between the cutters.

I claim—

1. In a machine for channeling leather straps, the combination, with the adjustable cutter-carriages, of the cutter-stocks pivoted thereto, the cutting-blades, and the screws f passing through slotted projections s in said carriages, whereby the cutter-stocks are adjusted and secured in proper relative angles for oblique channeling, substantially as herein set forth.

2. The combination, in a machine for channeling straps, of the adjustable cutter-carriages, the cutter-stocks pivoted thereto, and the cutting-blades, with the springs j, the thumb-nuts N, and the cam-buttons E, the said cutter-stocks having end cam formations F corresponding with the cam-buttons, substantially as herein described, for the purpose specified.

3. The combination, with the cutter-carriages, and the cutter-stocks pivoted thereto, of the cutter-blades, the springs j, the thumb-nuts N, the cam-buttons E, and the washers locked to the cutter-stocks between the cam-buttons and the thumb-nuts, substantially as described, for the purpose specified.

4. The combination, in a machine for channeling leather straps, of the adjustable carriages each having a side vertical slotted projection, s, with the cutter-stocks each having an end cam formation, F, the cam-buttons E, the thumb-nuts N, the springs j, and the set-screws f, passing through the slots of said carriage projections into the cutter-stocks, substantially as described, for the purpose specified.

5. The cutter-stock e and the carriage S, pivoted together, as described, the former carrying the cutter-blade d, and adjustable upon its pivot to vary its inclination by the slot g, and the clamp-screw f, in combination with the adjusting-screws T, the lugs t u, the springs j, the adjusting-nut N, and the adjusting cam-buttons, substantially as described, for the purpose specified.

In testimony whereof I have hereunto set my hand in the presence of two subscribing witnesses.

THOMAS K. CLARK.

Witnesses:
S. C. TRACEY,
G. W. ANDERSON.